United States Patent
Lee

(10) Patent No.: US 7,136,676 B2
(45) Date of Patent: Nov. 14, 2006

(54) MOBILE TERMINAL FOR DISPLAYING A VARIABLE AUXILIARY DISPLAY AREA AND METHOD THEREOF

(75) Inventor: Hwa-Jin Lee, Gunpo-si (KR)

(73) Assignee: Samsung Electronics Co., Ltd. (KR)

( * ) Notice: Subject to any disclaimer, the term of this patent is extended or adjusted under 35 U.S.C. 154(b) by 189 days.

(21) Appl. No.: 10/801,445

(22) Filed: Mar. 16, 2004

(65) Prior Publication Data

US 2005/0049006 A1    Mar. 3, 2005

(30) Foreign Application Priority Data

Aug. 29, 2003    (KR) .................. 10-2003-0060189

(51) Int. Cl.
*H04B 1/38* (2006.01)
*H04M 1/00* (2006.01)

(52) U.S. Cl. .................. 455/566; 455/550.1; 345/1.1; 345/1.3

(58) Field of Classification Search ............ 455/550.1, 455/556.1, 556.2, 566; 345/1.1, 1.3, 2.2, 345/30

See application file for complete search history.

(56) References Cited

U.S. PATENT DOCUMENTS

| 4,885,580 | A | * | 12/1989 | Noto et al. ................ 341/23 |
| 5,128,672 | A | * | 7/1992 | Kaehler .................... 341/23 |
| 5,588,105 | A | * | 12/1996 | Foster et al. ............ 715/779 |
| 6,023,620 | A | * | 2/2000 | Hansson ................. 455/419 |
| 6,624,801 | B1 | * | 9/2003 | Moriyama ............... 345/100 |
| 2003/0144024 | A1 | * | 7/2003 | Luo ....................... 455/551 |
| 2004/0030596 | A1 | * | 2/2004 | Attar et al. ............... 705/14 |
| 2004/0198457 | A1 | * | 10/2004 | Hayashida et al. ........ 455/566 |

* cited by examiner

*Primary Examiner*—Steve M. D'Agosta
(74) *Attorney, Agent, or Firm*—Dilworth & Barrese LLP

(57) ABSTRACT

A mobile terminal for displaying an auxiliary display area and a method thereof. All information except for the state information (e.g., reception sensitivity and battery state) and operation information (e.g., background image, call time, and menu list) of a mobile terminal can be displayed in the auxiliary display area. The mobile terminal sets the auxiliary display area differently depending on the characteristics of information to be displayed and displays it with corresponding information. Accordingly, the utilization of the auxiliary display area is increased.

5 Claims, 4 Drawing Sheets

| MANAGEMENT LIST OF AUXILIARY DISPLAY AREA INFORMATION | (110) |
|---|---|
| ID | (111) |
| OVERALL SIZE | (112) |
| DISPLAYED POSITION | (113) |
| BASIC DATA | (114) |
| POSITION OF BASIC DATA | (115) |

FIG.3

MOBILE TERMINAL FOR DISPLAYING A VARIABLE AUXILIARY DISPLAY AREA AND METHOD THEREOF

PRIORITY

This application claims priority under 35 U.S.C. § 119 to an application entitled "Mobile Terminal for Displaying Variable Auxiliary Display Area and Method Thereof" filed in the Korean Intellectual Property Office on Aug. 29, 2003 and assigned Ser. No. 2003-60189, the contents of which are incorporated herein by reference.

BACKGROUND OF THE INVENTION

1. Field of the Invention

The present invention relates generally to a mobile terminal and a display method thereof, and in particular, to a mobile terminal and a method for displaying a variable auxiliary display area.

2. Description of the Related Art

FIG. 1 illustrates display areas in a conventional mobile terminal. Referring to FIG. 1, a state display area 10, a main display area 20, and an auxiliary display area 30 are defined on the mobile terminal. The state display area 10 displays the state of the mobile terminal (e.g. reception sensitivity, battery state, etc.), the main display area 20 displays the operational state of the mobile terminal (e.g. background image, call time, menu list, etc.), and the auxiliary display area 30 displays buttons that aid the user manipulation of the mobile terminal.

"Menu" and "Select" buttons are defined in the auxiliary display area 30 in FIG. 1, for illustrative purposes. This auxiliary display area 30 is called a command bar or a navigation bar and represents a different command under circumstances, such as Option, End-Call, Menu and the like. The auxiliary display area 30 is fixed in area and always displayed irrespective of the operational state of the mobile terminal.

As a result, the fixed representation of the auxiliary display area 30 limits the use of the auxiliary display area 30. That is, it can be used as nothing but a command bar or a navigation bar.

SUMMARY OF THE INVENTION

An object of the present invention is, therefore, to provide a mobile terminal for using an auxiliary display area for various purposes and a method thereof.

Another object of the present invention is to provide a mobile terminal for using an auxiliary display area that is variable in at least one of size, position, and represented information.

A further object of the present invention is to provide a recording medium on which a method of using an auxiliary display area of a mobile terminal that is variable in at least one of size, position, and represented information is recorded.

The above and other objects are achieved by a mobile terminal for displaying an auxiliary display area, a method thereof, and a computer-readable recording medium having instructions for implementing the method.

In the mobile terminal, an auxiliary display area information storage stores information about an auxiliary display area variable in at least one of size, position, and represented information, an input portion receives a control signal according to user key manipulation, and a signal from a wireless network. A controller analyzes a signal received from the input portion, reads auxiliary display area information corresponding to the analyzed signal from the auxiliary display area information storage, and generates a display control signal according to the auxiliary display area information. A display displays the auxiliary display area according to the display control signal.

In the display method, generation of an event that triggers display of an auxiliary display area variable in at least one of size, position, and represented information is awaited. Upon generation of an event, its type is determined. Auxiliary display area information corresponding to the event type is read among stored auxiliary display area information and the auxiliary display area is displayed according to the read auxiliary display area information.

The computer-readable recording medium comprises instructions for causing a processor to await generation of an event that triggers display of an auxiliary display area variable in at least one of size, position, and represented information, determine the type of an event upon generation of the event, read auxiliary display area information corresponding to the event type among stored auxiliary display area information, and display the auxiliary display area according to the read auxiliary display area information.

BRIEF DESCRIPTION OF THE DRAWINGS

The above and other objects, features, and advantages of the present invention will become more apparent from the following detailed description when taken in conjunction with the accompanying drawings in which:

FIG. 3 illustrates a management list of auxiliary display area information according to an embodiment of the present invention;

DETAILED DESCRIPTION OF THE PREFERRED EMBODIMENT

Preferred embodiments of the present invention will be described in detail herein below with reference to the accompanying drawings. In the following description, well-known functions or constructions are not described in detail since they would obscure the invention in unnecessary detail.

Figure 1:
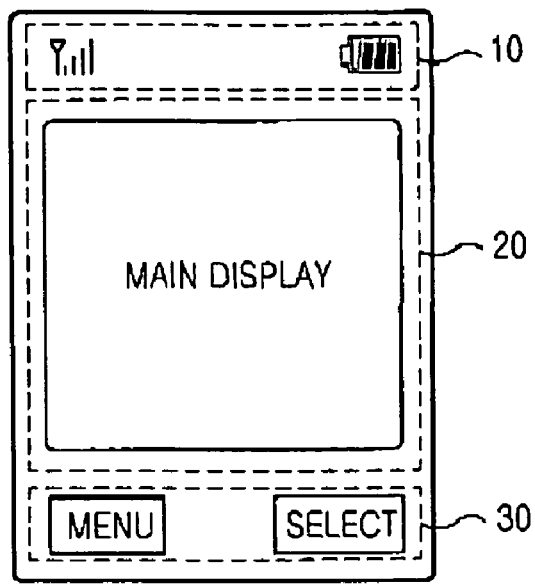
FIG. 1 illustrates display areas in a conventional mobile terminal.
Figure 2:
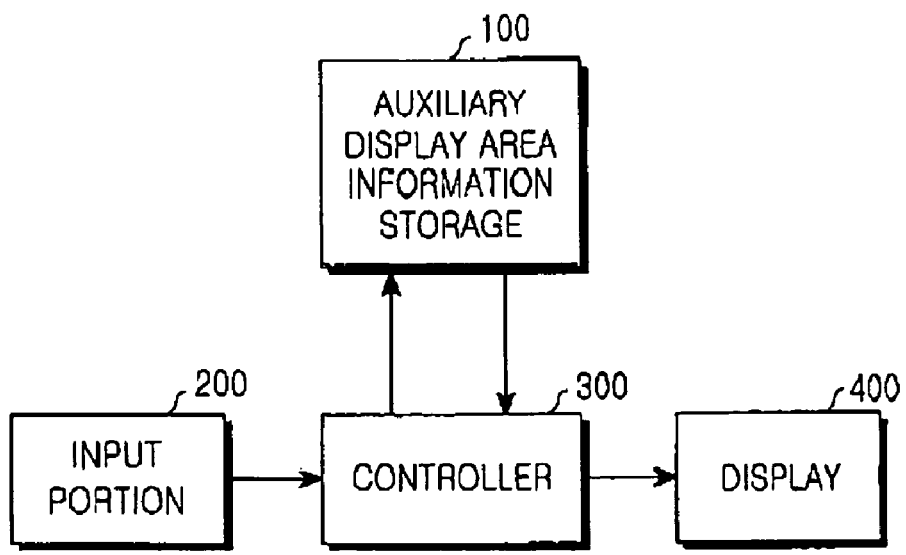
FIG. 2 is a schematic block diagram of a mobile terminal according to an embodiment of the present invention.

FIG. 2 is a block diagram of a mobile terminal according to an embodiment of the present invention. Referring to FIG. 2, the mobile terminal comprises an auxiliary display area information storage 100, an input portion 200, a controller 300, and a display 400. Components of a typical mobile terminal, including a speaker, a microphone, a memory, a transmitter/receiver, etc., are not illustrated here.

The auxiliary display area information storage 100 stores information about an auxiliary display area. That is, it stores and manages information about the size of the auxiliary display area, its position in the overall display area of the mobile terminal, basic data represented in the auxiliary display area, and the positions of the presented basic data.

The input portion 200 transmits a control signal received through a keypad (not shown) or a signal received through a receiver (not shown) to the controller 300.

The controller 300 analyzes the received signal and reads corresponding auxiliary display area information from the auxiliary display area information storage 100. The controller 300 also controls the display 400 to display the auxiliary display area according to the auxiliary display area information. The display 400 displays the auxiliary display area on a screen (not shown) under the control of the controller 300.

The auxiliary display area is not a fixed area for displaying preset information therein but an area for displaying various types of information according to events, variable in at least one of size and position. A slip dialog component is preferably used to realize this variable auxiliary display area. The slip dialog component refers to an expanded dialog component including a command bar, which is opened upward.

More specifically, the mobile terminal displays all information except for its state information (e.g. reception sensitivity and battery state) and its operation information (e.g. background image, call time, and menu list) in the auxiliary display area. The mobile terminal sets the auxiliary display area depending on the characteristics of information to be displayed and displays it with corresponding information. For example, in the case of a short message or present time, the mobile terminal displays a different auxiliary display area with the short message or present time according to auxiliary display area information preset correspondingly for the information to be displayed.

FIG. 3 illustrates a management list 110 of auxiliary display area information stored in the storage 100 illustrated in FIG. 2 according to an embodiment of the present invention. Referring to FIG. 3, the management list 110 includes identification (ID) 111, overall size 112, displayed position 113, basic data 114, and basic data position 115.

The ID 111 identifies auxiliary display area information. For example, the ID 111 is set to 1 for auxiliary display area information related to a short message, and 2 for auxiliary display area information corresponding to present time. Therefore, the controller 300 illustrated in FIG. 2 identifies necessary auxiliary display area information by its ID. If the controller needs auxiliary display area information for a short message, it refers to auxiliary display area information with ID=1 in the management list 110. It is preferred that the controller knows the IDs of auxiliary display area information corresponding to information to be displayed in the auxiliary display area. The IDs are preferably provided to the controller when the management list 110 is generated, for example.

The overall size 112 indicates the size of the auxiliary display area in the overall display area of the mobile terminal and the displayed position 113 indicates the position of the auxiliary display area in the overall display area.

The basic data 114 is information that is displayed in the auxiliary display area, and the basic data position 115 indicates the positions of the basic data displayed in the auxiliary display area.

If "New Message!!!" is displayed in an upper portion of the auxiliary display area to alert a user to reception of a short message, "New Message!!!" corresponds to the basic data and the upper portion of the auxiliary display area is the basic data position information.

Figure 4:
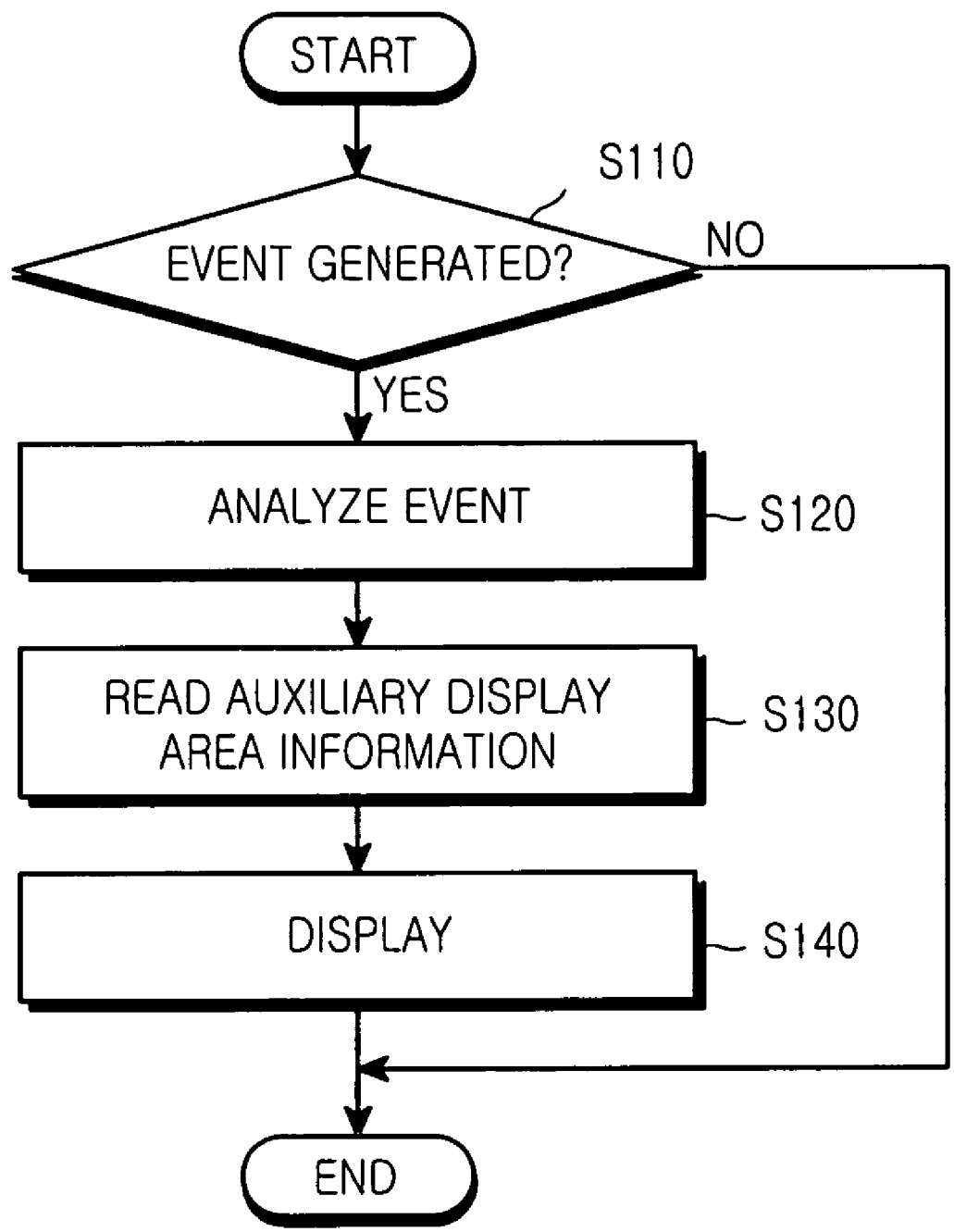
FIG. 4 is a flowchart illustrating a method of displaying an auxiliary display area according to an embodiment of the present invention.

FIG. 4 is a flowchart illustrating a method of displaying the auxiliary display area according to an embodiment of the present invention. Referring to FIGS. 2 and 4, the controller 300 determines whether an event requiring display of an auxiliary display area has been generated through the input portion 200 in step S110. There may be several of such events depending on the functional capabilities of the mobile terminal. For example, the events include reception of a short message over a wireless network and a request for displaying present time by user key manipulation.

Upon generation of a particular event in step S110, the controller 300 analyzes the event, that is, determines the type of the event in step S120. In step S130, the controller 300 reads auxiliary display area information corresponding to the event type from the storage 100 and controls the display 400 to display the auxiliary display area according to the read information. That is, the controller 300 reads the auxiliary display area information corresponding to the generated event among stored auxiliary display area information for respective events and controls the display 400 according to the auxiliary display area information. In step S140, the display 400 displays the auxiliary display area with information related with the event.

Figure 5A:
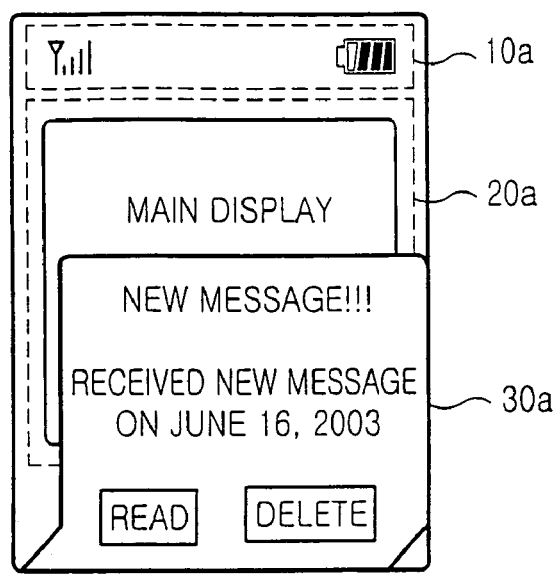
FIGS. 5A and 5B illustrate representations of the auxiliary display area according to an embodiment of the present invention.
Figure 5B:
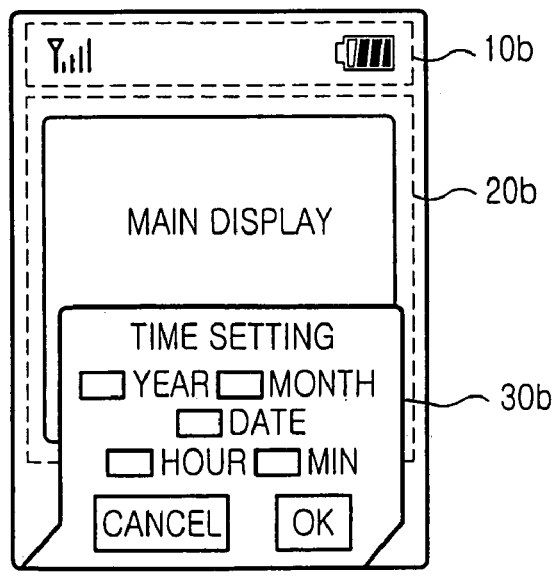

FIGS. 5A and 5B illustrate representations of the auxiliary display area according to an embodiment of the present invention. FIG. 5A illustrates a display of an auxiliary display area to alert a user to reception of a short message over a wireless network, and FIG. 5B illustrates another display of the auxiliary display area for time setting. In FIGS. 5A and 5B, reference numerals 10a and 10b denote state display areas, reference numerals 20a and 20b denote main display areas, and reference numerals 30a and 30b denote auxiliary display areas.

Referring to FIGS. 5A and 5B, the auxiliary display areas 30a and 30b are difference in size, position, and represented information. This implies that the utilization of the auxiliary display area can be increased.

In accordance with the present invention as described above, all information except for the state information (e.g. reception sensitivity and battery state) and operation information (e.g. background image, call time, and menu list) of a mobile terminal can be displayed in an auxiliary display area. The mobile terminal sets the auxiliary display area differently depending on the characteristics of information to be displayed and displays it with corresponding information. Therefore, the auxiliary display area can be used for various purposes.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. A mobile terminal for displaying a variable auxiliary display area, comprising:
   a state display area;
   a main display area;
   an auxiliary display area which overlaps the main display and is variable in at least one of size, position, and represented information;
   an auxiliary display area information storage for storing information about the auxiliary display area, including size information for the auxiliary display area to be displayed, position information for the auxiliary display area in an overall display area of the mobile terminal, basic data represented in the auxiliary display area, and position information for the basic data;

an input portion for receiving a control signal according to user key manipulation and a signal from a wireless network;

a controller for analyzing a signal received from the input portion, reading auxiliary display area information corresponding to the analyzed signal from the auxiliary display area information storage, and generating a display control signal according to the auxiliary display area information; and a display for displaying the auxiliary display area according to the display control signal.

2. The mobile terminal of claim 1, wherein the display control signal commands the auxiliary display area to be displayed using a slip dialog component.

3. A method for displaying a variable auxiliary display area in a mobile terminal, comprising the steps of:

awaiting generation of an event that triggers display of the auxiliary display area, which overlaps a main display of the mobile terminal and is variable in at least one of size, position, and represented information;

determining a type of the event depending upon the generation of the event;

reading auxiliary display area information corresponding to the event type from stored auxiliary display area information, by reading information about a position and a size of the auxiliary display area corresponding to the event type, basic data included in the auxiliary display area, and a position of the basic data; and displaying the auxiliary display area according to the read auxiliary display area information.

4. The display method of claim 3, wherein the event is generated by one of a control command and a signal received from a wireless network.

5. A computer-readable recording medium readable by a machine, tangibly embodying instructions executable by the machine to perform method steps for method for displaying a variable auxiliary display area in a mobile terminal, comprising:

awaiting generation of an event that triggers display of the auxiliary display area, which overlaps a main display of the mobile terminal and is variable in at least one of size, position, and represented information;

determining a type of the event depending upon the generation of the event;

reading auxiliary display area information corresponding to the event type from stored auxiliary display area information, by reading information about a position and a size of the auxiliary display area corresponding to the event type, basic data included in the auxiliary display area, and a position of the basic data; and displaying the auxiliary display area according to the read auxiliary display area information.

* * * * *